(12) United States Patent
Huang et al.

(10) Patent No.: US 10,107,405 B2
(45) Date of Patent: Oct. 23, 2018

(54) TILTING DISC CHECK VALVE (71) Applicant: ZHUZHOU SOUTHERN VALVE CO., LTD, Zhuzhou (CN)

(72) Inventors: Jing Huang, Zhuzhou (CN); Jianqun Luo, Zhuzhou (CN); Xinchun Gui, Zhuzhou (CN); Aihua Tang, Zhuchou (CN); Jianguo Yin, Zhuzhou (CN); Zhen Dong, Zhuzhou (CN)

(73) Assignee: ZHUZHOU SOUTHERN VALVE CO., LTD., Zhuzhou (CN)

( * ) Notice: Subject to any disclaimer, the term of this patent is extended or adjusted under 35 U.S.C. 154(b) by 0 days.

(21) Appl. No.: 14/781,566

(22) PCT Filed: Jul. 4, 2014

(86) PCT No.: PCT/CN2014/081694
§ 371 (c)(1),
(2) Date: Oct. 1, 2015

(87) PCT Pub. No.: WO2015/003584
PCT Pub. Date: Jan. 15, 2015

(65) Prior Publication Data
US 2016/0053904 A1 Feb. 25, 2016

(30) Foreign Application Priority Data

Jul. 12, 2013 (CN) .......................... 2013 1 0293501

(51) Int. Cl.
F16K 15/18 (2006.01)
F16K 39/02 (2006.01)
(Continued)

(52) U.S. Cl.
CPC .......... *F16K 15/181* (2013.01); *F04B 53/001* (2013.01); *F04B 53/102* (2013.01);
(Continued)

(58) Field of Classification Search
CPC ........ F16K 15/181; F16K 1/20; F16K 1/2021; F16K 31/1266; F16K 39/024;
(Continued)

(56) References Cited

U.S. PATENT DOCUMENTS 2,106,723 A * 2/1938 Collison ............... F16K 1/2028
251/229
2,818,091 A * 12/1957 Rafferty ............... F16K 47/023
141/225
(Continued)

FOREIGN PATENT DOCUMENTS

CN 2120992 U 11/1992
CN 2568900 Y 8/2003
(Continued)

*Primary Examiner* — Craig Schneider
*Assistant Examiner* — Frederick D Soski
(74) *Attorney, Agent, or Firm* — AEON Law, PLLC; Adam L. K. Philipp; David V. H. Cohen (57) ABSTRACT The invention discloses a tilting disc check valve, which includes a left valve body (1), a right valve body (2), a large valve plate (3), a small valve plate (4) and a diaphragm control group (5), wherein the left valve body (1) and the right valve body (2) are butted into a whole through oblique openings; the oblique openings are inclined in a manner that upper parts are inclined towards the right valve body (2); the diaphragm control group (5) is arranged on the left valve body (1); the large valve plate (3) is arranged along the oblique openings; the large valve plate (3) is positioned in a valve cavity formed by the left valve body (1) and the right valve body (2); the large valve plate (3) is suspended on shaft holes of the left valve body (3) through valve shafts (6); the small valve plate (4) is connected with the diaphragm control group (5); and the small valve plate (4) is mounted at a slow closing valve port of the large valve plate (3) through a small valve plate pin shaft (7). According to the tilting disc check valve, a two-stage valve closing process (Continued)

where the large valve plate is quickly closed and the small valve plate at a drain hole of the large valve plate is slowly closed within adjustable time can be implemented, and the aims of reducing backflow of a water body and eliminating pump starting and stopping water hammer are fulfilled.

18 Claims, 9 Drawing Sheets

(51) Int. Cl.
    *F16K 31/126*    (2006.01)
    *F16K 1/20*    (2006.01)
    *F16K 47/02*    (2006.01)
    *F04B 53/10*    (2006.01)
    *F04B 53/00*    (2006.01)

(52) U.S. Cl.
    CPC ............ *F04B 53/1087* (2013.01); *F16K 1/20* (2013.01); *F16K 1/2021* (2013.01); *F16K 31/1266* (2013.01); *F16K 39/024* (2013.01); *F16K 39/028* (2013.01); *F16K 47/023* (2013.01); *Y10T 137/7841* (2015.04)

(58) Field of Classification Search
    CPC .... F16K 39/028; F16K 47/023; F04B 53/001; F04B 53/102; F04B 53/1087; Y10T 137/7841; Y10T 137/7847; Y10T 137/7845; Y10T 137/7846; Y10T 137/7849; Y10T 137/7898; Y10T 137/7901; Y10T 137/8292
    See application file for complete search history.

(56) References Cited

U.S. PATENT DOCUMENTS

| | | | | |
|---|---|---|---|---|
| 2,973,935 A * | 3/1961 | Sullivan | ................. | F16K 31/42 236/1 E |
| 3,704,721 A * | 12/1972 | Schmitz | ................. | F16K 31/42 137/102 |
| 4,127,142 A * | 11/1978 | Snider | ................. | E03B 9/04 137/285 |
| 4,477,051 A * | 10/1984 | Ben-Yehuda | ......... | F16K 31/402 251/298 |
| 4,596,263 A * | 6/1986 | Snider | ................. | E03B 9/04 137/493.3 |
| 4,617,959 A * | 10/1986 | Yamada | ................. | F16K 15/033 137/484.2 |
| 4,634,093 A | 1/1987 | Schintgen | | |
| 4,660,599 A * | 4/1987 | Fast | ................. | F16K 17/12 137/512 |
| 4,718,445 A * | 1/1988 | Lundberg | ............ | F16K 37/0008 116/201 |
| 4,964,422 A * | 10/1990 | Ball | ................. | F16K 1/221 137/512.1 |
| 5,076,308 A * | 12/1991 | Cohen | ................. | F16K 37/0016 116/277 |
| 5,499,658 A * | 3/1996 | Bridges | ................. | F16K 1/2007 137/886 |
| 5,921,862 A * | 7/1999 | Ucciardi | ................. | F24F 11/047 137/527.6 |
| 7,571,742 B2 * | 8/2009 | Horner | ................. | F16K 1/22 123/337 |
| 2007/0012367 A1* | 1/2007 | Hotz | ................. | F16K 5/0647 137/556.3 |
| 2008/0083464 A1* | 4/2008 | Shimizu | ................. | E03F 1/006 137/527 |
| 2012/0087609 A1* | 4/2012 | Tung | ................. | F16C 17/02 384/397 |
| 2013/0133763 A1* | 5/2013 | Sulmone | ............ | F16K 37/0008 137/556.6 |
| 2014/0145429 A1* | 5/2014 | Chung | ................. | E02F 9/006 285/144.1 |

FOREIGN PATENT DOCUMENTS

| | | | | |
|---|---|---|---|---|
| CN | 2604586 Y | | 2/2004 | |
| CN | 101144550 A | * | 3/2008 | ............ F16K 15/18 |
| CN | 201106699 Y | | 8/2008 | |
| CN | 201265674 A | * | 7/2009 | ............ F16K 15/18 |
| CN | 201265674 Y | | 7/2009 | |
| CN | 201739530 U | | 2/2011 | |
| CN | 202418753 U | | 9/2012 | |
| CN | 103334920 A | | 10/2013 | |
| JP | 2002098248 A | | 4/2002 | |
| WO | 2012038056 A1 | | 3/2012 | |

* cited by examiner

TILTING DISC CHECK VALUE

TECHNICAL FIELD OF THE INVENTION

The invention relates to the technical field of check valves, and in particular to a diaphragm type slider control tilting disc check valve mounted at a water outlet of a water pump.

BACKGROUND OF THE INVENTION

A check valve is a group arranged in a pipeline to make a medium directionally to flow without backflow, and is used for various pipe networks more and more widely. At present, a check valve mounted at a water outlet of a water pump is capable of automatically realizing pump starting when valve is closed and two-stage closing without any other additional device has many problems in terms of structure and use.

① A slow closing small valve plate (or called a slow closing cam) is connected with a valve rod through a hinge (or a chain plate) with a sliding chute, there is a free travel, the valve rod cannot completely control the position of the slow closing small valve plate, and in a running process of the valve, the slow closing small valve plate is in an uncontrolled state, and may swing under the disturbance of water flow, so that flow resistance is increased, and an opening state of the valve cannot be externally reflected; and when the small valve plate is not at a completely-opened position under a small-flow or low-pressure working condition, the slow closing small valve plate may be rapidly closed under the action of gravity due to the existence of the free travel when a large valve plate is rapidly closed, so that a slow closing stage of two-stage valve closing exists in name only.

② An eccentric design of the large valve plate is unreasonable and free of gravity centre check, and the completely closing of the large valve plate requires backflow water, which may cause a phenomenon of collision during valve closing, high backflow, long reversal time of the water pump, high reversal rotating velocity and potential safety hazards; and a metal hard sealing form of a sealing pair is not allowed due to the existence of phenomena of collision and impact.

③ After the whole valve is closed, the valve rod serves as a maximum force applicator, and maximum support reaction on the valve rod forms an included angle with an axial line of the valve rod, so that the valve rod is subjected to radial bending moment, and is easily bent, and a guide bushing of the valve rod is easily squeezed and damaged to cause a failure of the valve rod.

④ Disconnection prevention structures such as locking nuts and split pins are adopted as connecting parts of the slow closing small valve plate (or called the slow closing cam), and since the small valve plate swings under the disturbance of the water flow, the phenomena that the split pins are sheared, the locking nuts are loosened and disconnected and the whole slow closing cam is detached and washed away by water often appear, which makes it impossible to close a slow closing hole.

⑤ A shape of the large valve plate is inconsistent with a low-flow-resistance drop-shaped streamlined design, and the small valve plate with the free travel may swing under the disturbance of the water flow, so that running water head loss is increased, and the valve is not an energy-saving product.

⑥ A straight flow type structure is adopted, so that resistance loss is great.

Therefore, the research and development of a novel diaphragm control slider type tilting disc check valve has become a technical problem urgent to be solved.

SUMMARY OF THE INVENTION

A purpose of the invention is to provide a diaphragm control slider type tilting disc check valve, so as to solve the technical problem of slow closing failure of two-stage closing, correct an unreasonable eccentric design, completely eradicate the loosening and disconnection of a slow closing part, eliminate valve closing impact, reduce flow resistance and water head loss, prevent environmental pollution caused by oil leakage and the like.

In order to achieve the purpose, according to one aspect of the invention, a tilting disc check valve is provided, which comprises a left valve body, a right valve body, a large valve plate, a small valve plate and a diaphragm control group, wherein the left valve body and the right valve body are butted into a whole through oblique openings; the oblique openings are inclined in a manner that upper parts is inclined towards the right valve body; the diaphragm control group is arranged on the left valve body; the large valve plate is arranged along the oblique openings; the large valve plate is positioned in a valve cavity formed by the left valve body and the right valve body; the large valve plate is suspended on shaft holes of the left valve body through valve shafts; the small valve plate is connected with the diaphragm control group; and the small valve plate is mounted at a slow closing valve port of the large valve plate through a small valve plate pin shaft.

Furthermore, an included angle between each oblique opening or the large valve plate and a horizontal plane is 56 to 65 degrees.

Furthermore, the diaphragm control group comprises a valve rod; the valve rod is connected with a connecting rod and/or a slider; and the diaphragm control group is connected with the small valve plate through the connecting rod and/or the slider so as to ensure that the valve rod of the diaphragm control group is linked with the small valve plate.

Furthermore, the valve shafts are symmetrically arranged on the two sides of the large valve plate; valve plate bearings functioning in connection when the large valve plate is opened and closed are arranged on matching surfaces of the valve shafts and the valve rod; thrust bearings are arranged on end faces of the valve shafts; and the valve plate bearings and the thrust bearings are all self-lubricating bearings.

Furthermore, a streamlined sunken portion which is inwards sunken is arranged on an outer surface of the side, close to the right valve body, of the large valve plate; the large valve plate is further provided with a clump weight; a centre-of-gravity position of the large valve plate with the sunken part and the clump weight is checked, so that the large valve plate can be completely closed under the action of self weight; and an area of a plate surface of the small valve plate is 3 to 10 percent of that of a plate surface of the large valve plate.

Furthermore, an oblique valve seat is arranged between the left valve body and the right valve body; a valve plate sealing ring is arranged on the large valve plate; the valve plate sealing ring and the oblique valve seat form a pair of large valve plate sealing pair; the large valve sealing pair adopts a spherical and conical contact sealing form for sealing; and the valve plate sealing ring is made of a metal hard sealing material and/or a flexible sealing material.

Furthermore, oblique flanges are arranged on the oblique openings of the left valve body and the right valve body; the oblique valve seat is clamped between the oblique flange of the left valve body and the oblique flange of the right valve body; and the oblique valve seat is a detachable part or a non-detachable integrated unit.

Furthermore, a reserved interface is provided in a bottom of the tilting disc check valve, and a sealing cover or a damper is mounted on the reserved interface.

Furthermore, opening indication devices are connected to the valve shafts, and each opening indication device comprises an opening positioning column, an opening indication rod, an opening pointer and an opening label; the opening positioning columns are arranged at portions, connected with the large valve plate, of the valve shafts; the opening indication rods are arranged in the hollow valve shafts respectively; one end of each opening indication rod is connected with the corresponding opening positioning column, and the other end of each opening indication rod is exposed from the corresponding valve shaft, and penetrates through an end cover; the opening pointers are arranged on the opening indication rods penetrating through the end covers respectively, and the opening pointers point to the opening labels respectively; or signal sending devices are further mounted on the opening indication devices.

Furthermore, the diaphragm control group comprises a diaphragm seat, a rubber diaphragm and a valve cover; a chamber formed by the diaphragm seat and the valve cover is divided into two parts, i.e. an upper diaphragm cavity and a lower diaphragm cavity, through which no water passes, in a manner that the rubber diaphragm serves as an interface; the upper diaphragm cavity is communicated with an outlet of the valve through an upper bypass pipe; the lower diaphragm cavity is communicated with an inlet of the valve through a lower bypass pipe; the diaphragm control group further comprises the valve rod bushing, the valve rod and diaphragm pressure plates; the diaphragm pressure plates are closely attached to the rubber diaphragm; the valve rod bushing is fixed on the diaphragm seat; an upper part of the valve rod penetrates through the rubber diaphragm and the diaphragm pressure plates, and is fixed on an overlapped part formed by the rubber diaphragm and the diaphragm pressure plates; a middle part of the valve rod is sleeved with the valve rod bushing; a lower end of the valve rod is connected to the small valve plate; the slider and/or the connecting rod are/is arranged at the lower end of the valve rod; the valve rod is connected with the small valve plate through the connecting rod, or a sliding chute is further provided in the small valve plate, and the slider is matched with the sliding chute to connect the valve rod with the small valve plate, or the valve rod is connected with the small valve plate through a combined part of the slider and the connecting rod; the valve rod is kept in a vertical direction through the sliding of the slider in the sliding chute or through the connecting rod; and volumes of the upper diaphragm cavity and the lower diaphragm cavity change under the influence of a water pressure difference between an inlet of the valve and an outlet of the valve, changes in the volumes drive the valve rod to move up and down in the valve rod bushing, and the up-and-down movement is transmitted to the small valve plate through the slider and/or the connecting rod to make the small valve plate rotate around the small valve plate pin shaft.

The invention has beneficial effects as follows:

a. A double-valve plate design with the quick closing large valve plate and the slow closing small valve plate is adopted, the valve is opened slowly and then quickly when being opened, and slow opening is adjustable; when the valve is closed, the large valve plate is completely closed to cut off 95 percent of flow passage area when forward water flow approaches zero flow velocity under the dynamic balance of eccentric gravitational moment and forward residual flow thrust moment; and probable backflow increasing pressure is unloaded and released by adjustable slow closing of the slow closing small valve plate, and an optimal pump starting and stopping water hammer reduction function is realized.

b. The upper diaphragm cavity has a water hammer arrestment function.

c. A gravity centre checking design method is adopted for the quick closing large valve plate, the plane rolling thrust bearings arranged in pairs perform axial frictionless complete positioning on the large valve plate, and bottom surface hollowing and the additional clump weight on the back surface are combined, so that the large valve plate quickly responds to reduction in forward residual flow, and may be quickly closed in place by virtue of self weight without the driving of backflow when a pump is stopped, the problems of valve closing collision, sealing pair impact, long backflow time, quick closing only in case of increasing of the backflow and the like caused by dependence on the driving of the backflow are solved, and the problems that the sealing pairs only can adopt rubber flexible seal rather than metal hard seal and the like due to the existence of collision and impact during quick closing are further solved; and in addition, a low-flow-resistance drop-shaped design is adopted for a downstream section, so that minimum flow resistance of the valve is reduced.

d. The external opening indication devices are arranged, and the additional opening indication devices on the slow closing small valve plate are completely controlled. The horizontal hollow valve shafts and the opening indication rods are arranged, the slow closing small valve plate is connected with the perpendicular valve rod through the sliding chute and the slider, which do not have free travels, and the parts such as the small valve plate travel indication rods are arranged to realize the real-time display of the opening of the large and small valve plates.

e. The slider (a valve rod pin shaft) in the invention is designed to slide in the sliding chute to make the valve rod and the slow closing small valve plate form a completely controlled sliding rod mechanism and make a stress contact surface form a plane contact, and support reaction on the valve rod passes through an axial line of the valve rod, so that the valve rod is prevented from bearing bending moment, and the phenomenon that a guide bushing is squeezed to be broken by the valve rod is also avoided. In the invention, the slider and the sliding chute are adopted to completely control the movement of the slow closing small valve plate without swinging, and a pin shaft loosening prevention measure adopts a protrusion-free straddle screw loosening prevention measure which is reliable in loosening prevention. The valve rod is connected with the slow closing small valve plate through the sliding chute and the slider, so that the travel of the small valve plate is completely controlled, and a free swinging space is eliminated.

f. In the invention, the completely-opened position of the large valve plate is determined, and is completely determined axially through the plane rolling thrust bearings, so that the occurrence of phenomena of swinging and play is avoided; and the large valve plate is completely positioned axially through the plane rolling thrust bearings, clearance and play are avoided, jamming during opening and closing is avoided, quick response is made to flow and pressure changes of the forward residual flow during valve closing, collision during valve closing is avoided, and the valve can be quickly closed under the condition of zero flow velocity.

A disconnection prevention design of the small valve plate adopts a circumferential straddle set screw structure.

g. The bottom surface of the large valve plate is hollowed, the clump weight is additionally arranged on the back surface, the low-flow-resistance drop-shaped design is adopted for the flow passage section, and the sealing pairs are designed into a structure universal for rubber flexible sealing and metal hard sealing.

Besides the abovementioned purpose, characteristics and advantages, the invention further has other purposes, characteristics and advantages. The invention is further described below with reference to the drawings in detail.

BRIEF DESCRIPTION OF THE DRAWINGS

The drawings forming a part of the invention are adopted to provide further understanding of the invention, and schematic embodiments of the invention and description thereof are adopted to explain the invention and not intended to form improper limits to the invention. In the drawings.

DESCRIPTION ABOUT LEGENDS

1—left valve body; 2—right valve body; 3—large valve plate; 4—small valve plate; 5—diaphragm control group; 6—valve shaft; 7—small valve plate pin shaft; 8—oblique valve seat; 9—diaphragm seat; 10—rubber diaphragm; 11—valve cover; 12—upper bypass pipe; 13—lower bypass pipe; 14—valve rod bushing; 15—valve rod; 16—diaphragm pressure plate; 19—thrust bearing; 20—bearing positioning sleeve; 21—valve plate bearing; 22—end cover; 23—opening positioning column; 24—opening indication rod; 25—opening pointer; 26—opening label; 27—valve plate sealing ring; 28—small valve plate rubber ring; 29—slow closing valve seat; 30—sunken portion; 31—valve rod pin shaft; 32—upper valve rod bushing; 33—lower valve rod bushing; 34—connecting rod; 35—reserved interface; 36—sealing cover; 37—clump weight; 38—limiting block; 39—signal sending device; 40—damper.

DETAILED DESCRIPTION OF THE EMBODIMENTS

The embodiment of the invention is described below with reference to the drawings in detail, but the invention may be implemented by multiple different manners limited and covered by Claims.

Figure 1A:
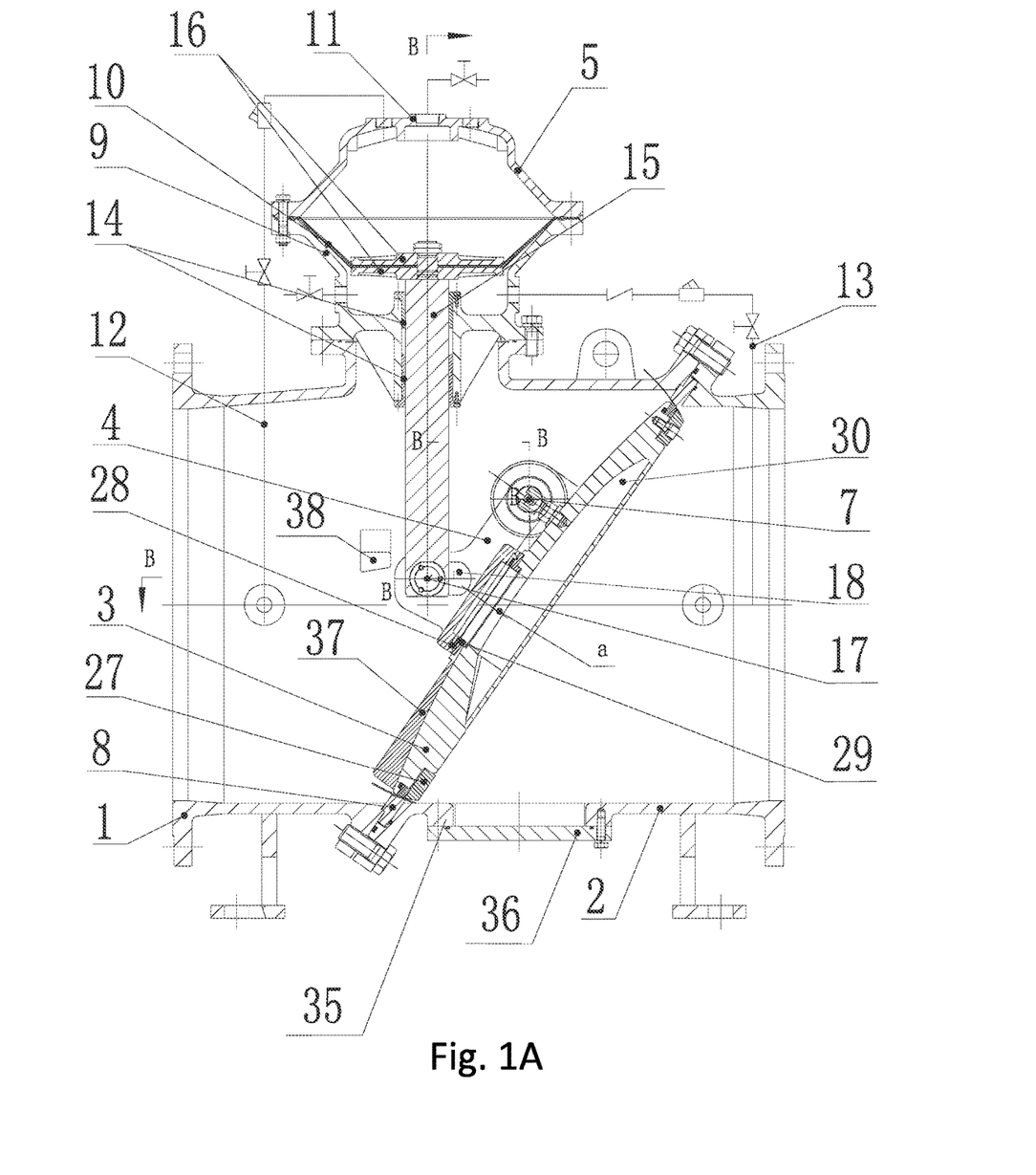
FIGS. 1A-1C are side view diagrams of a diaphragm control slider type tilting disc check valve according to a preferred embodiment of the invention showing diaphragm and valve parts in moved positions.
Figure 1B:
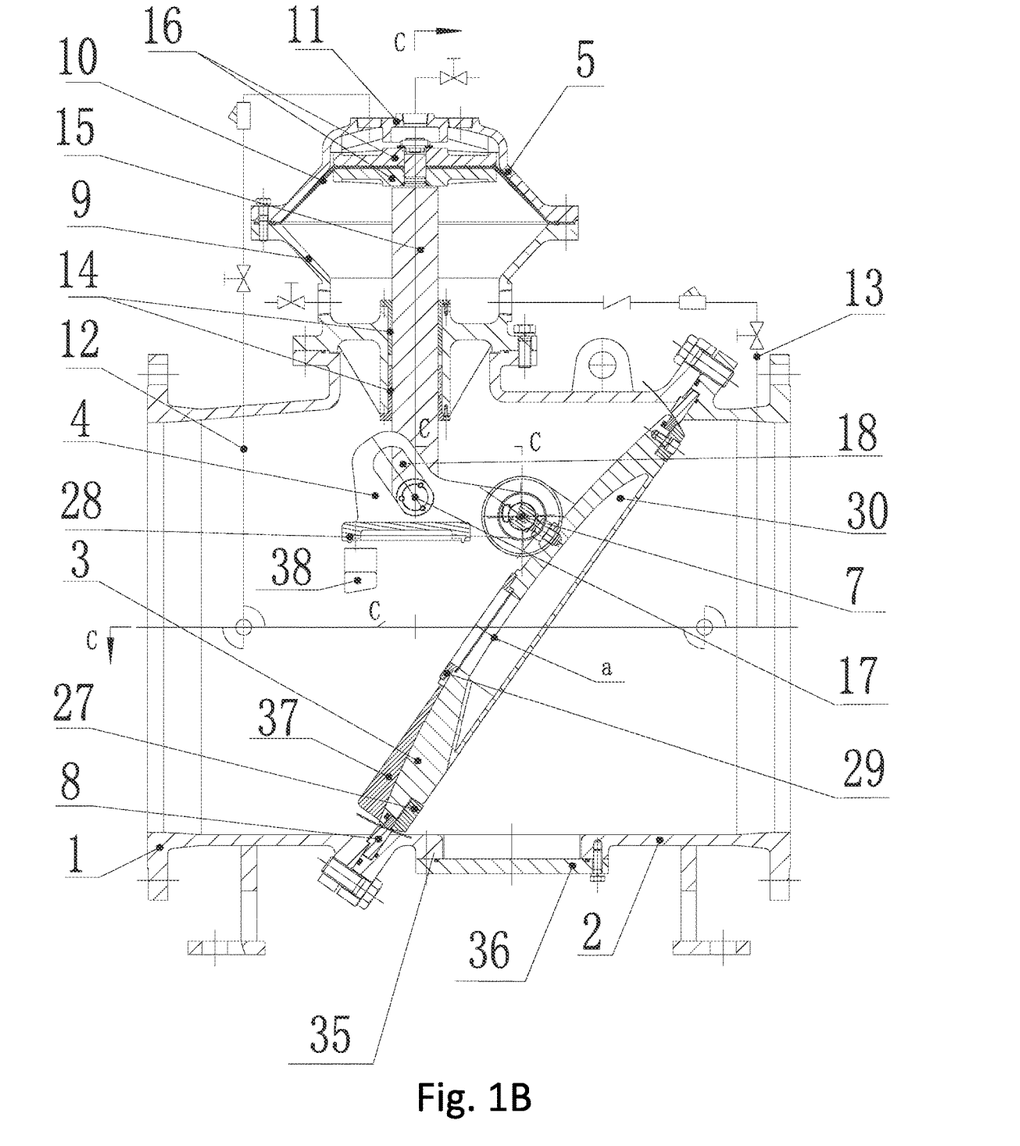
Figure 1C:
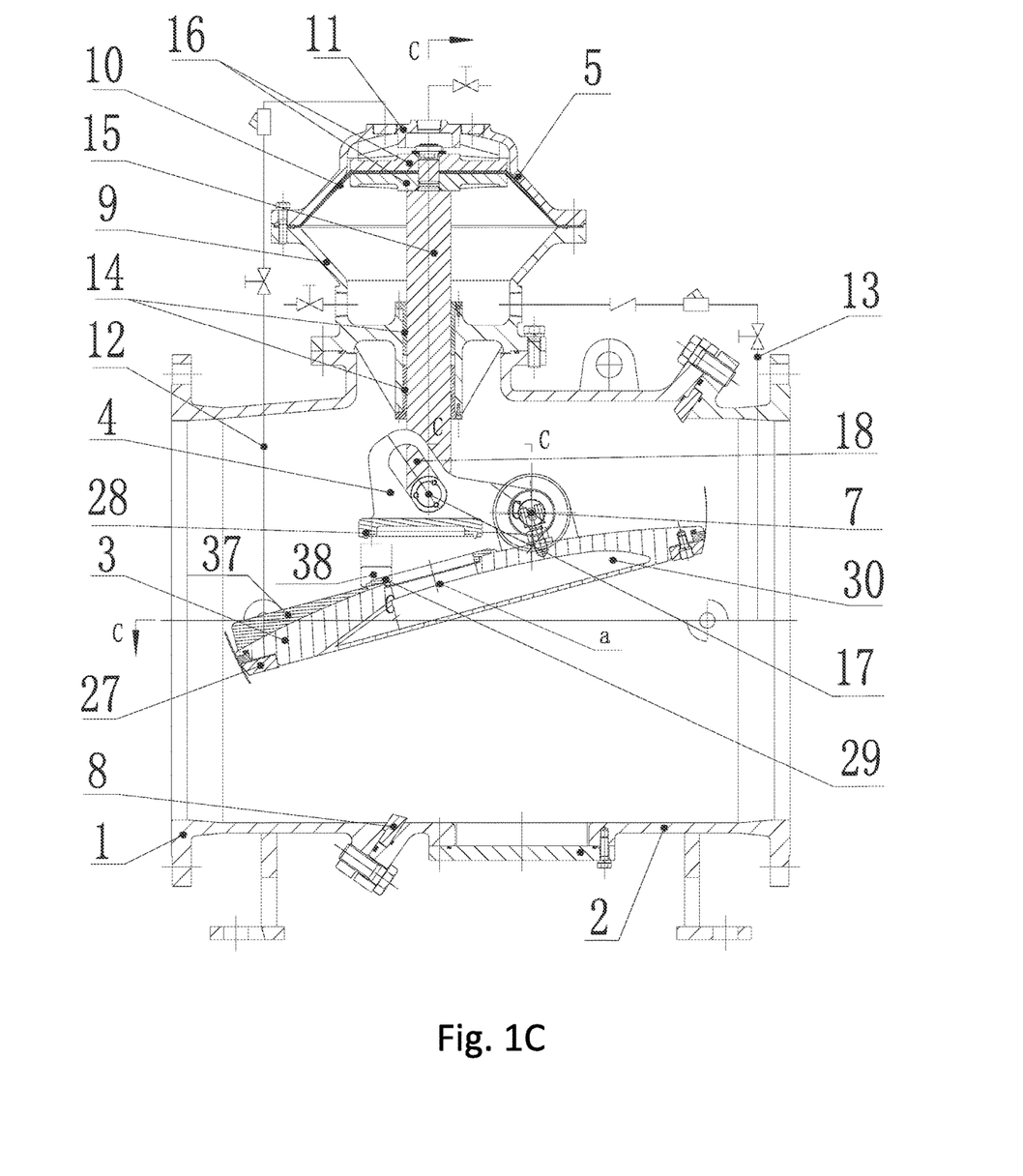
Figure 2A:
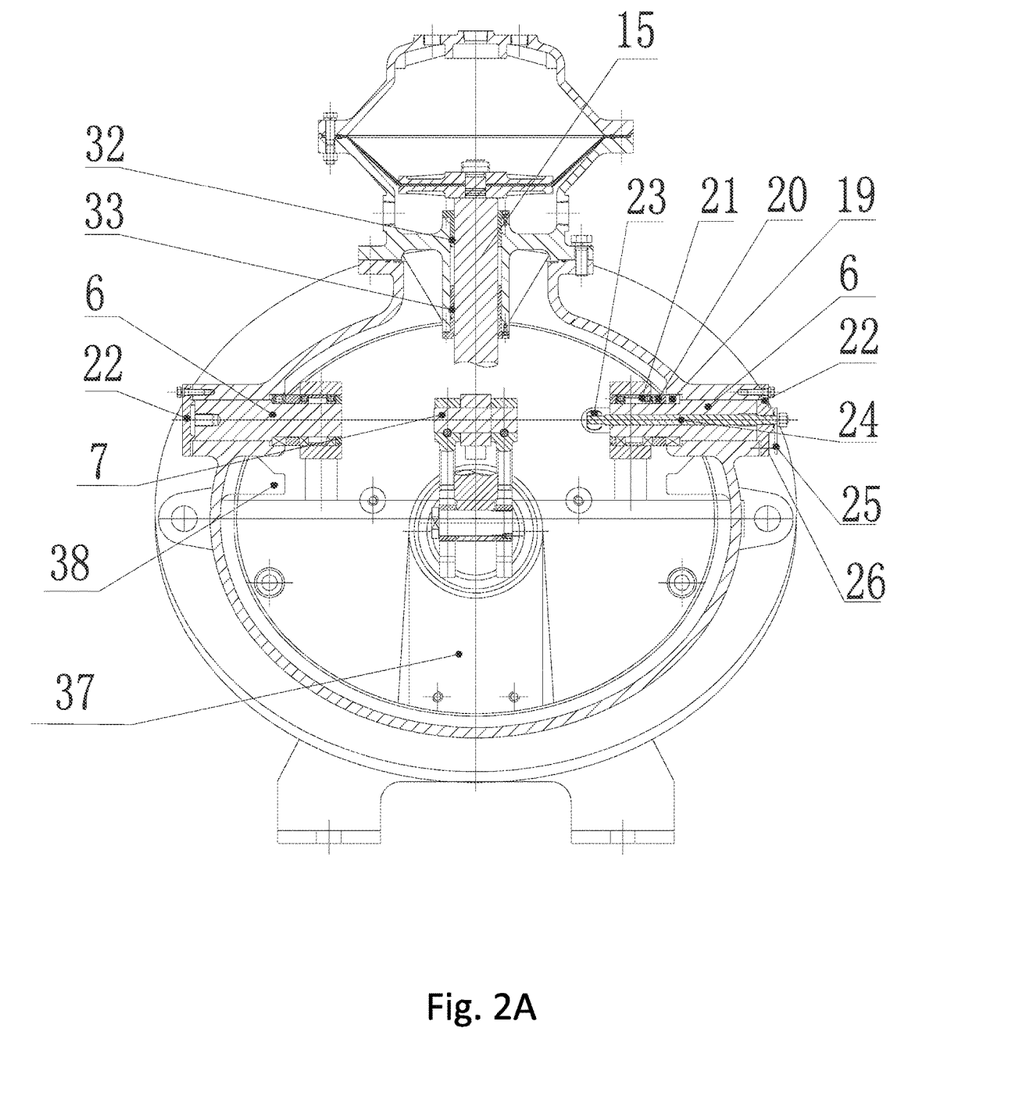
FIGS. 2A-2B are end sectional view diagrams of a diaphragm control slider type tilting disc check valve according to a preferred embodiment of the invention showing diaphragm and valve parts in moved positions.
Figure 2B:
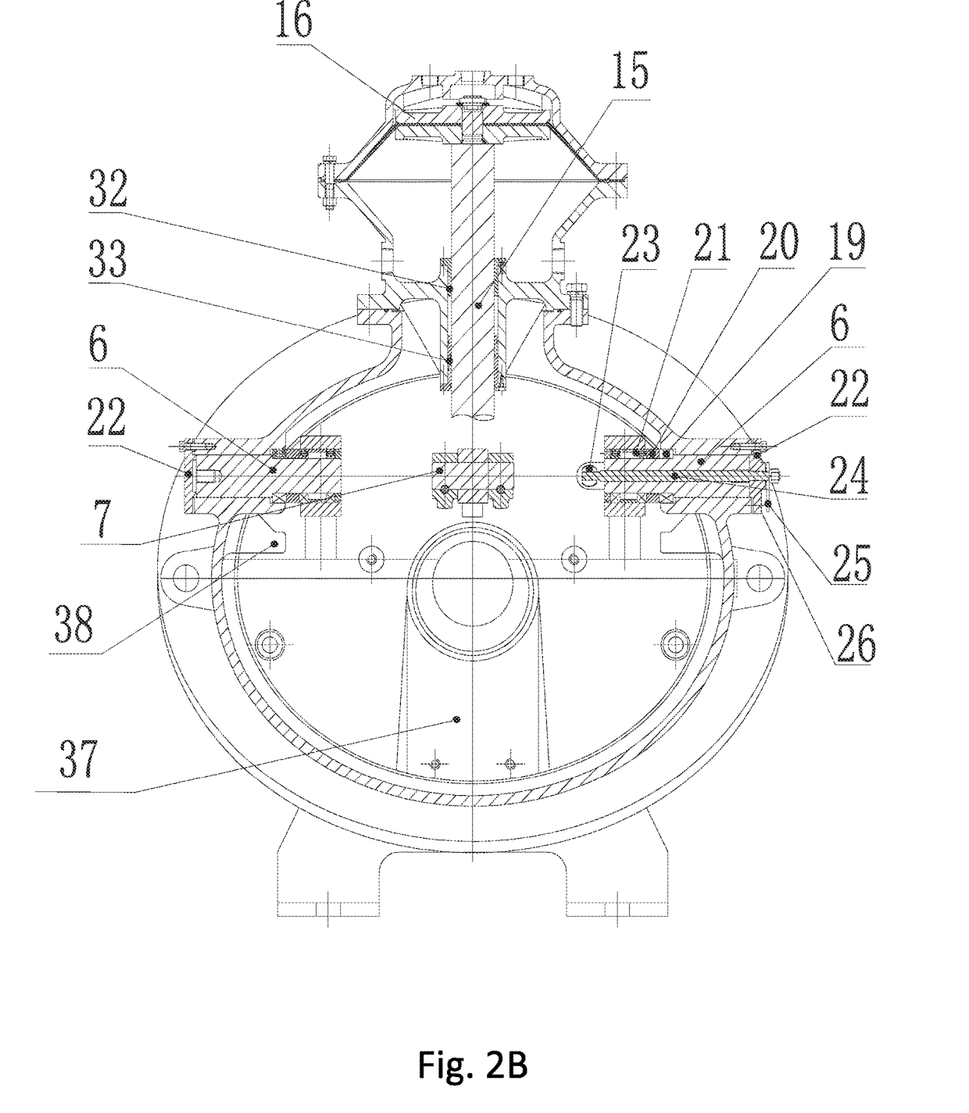
Figure 2C:
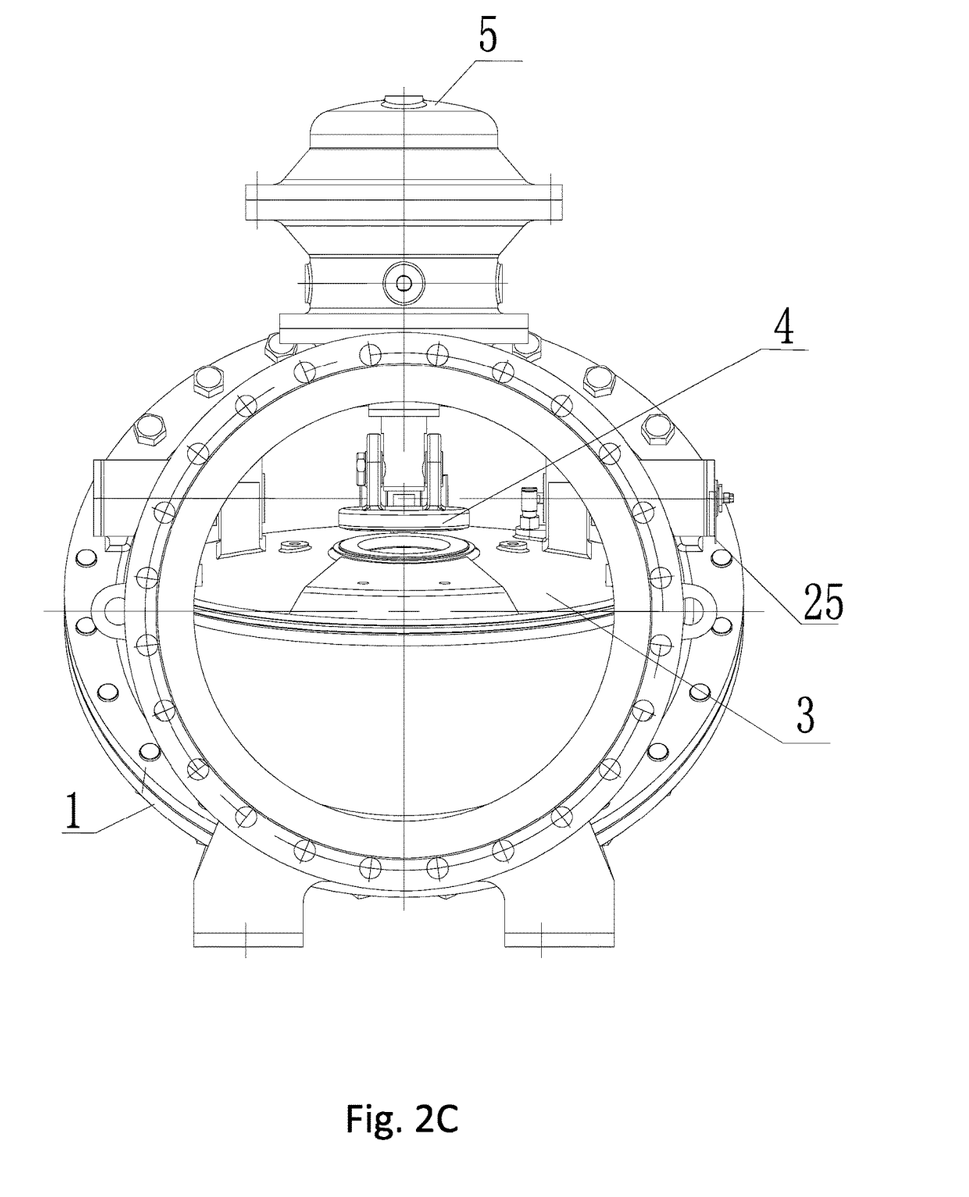
FIG. 2C is an end exterior view of a diaphragm control slider type tilting disc check valve according to an embodiment of the invention.
Figure 3A:
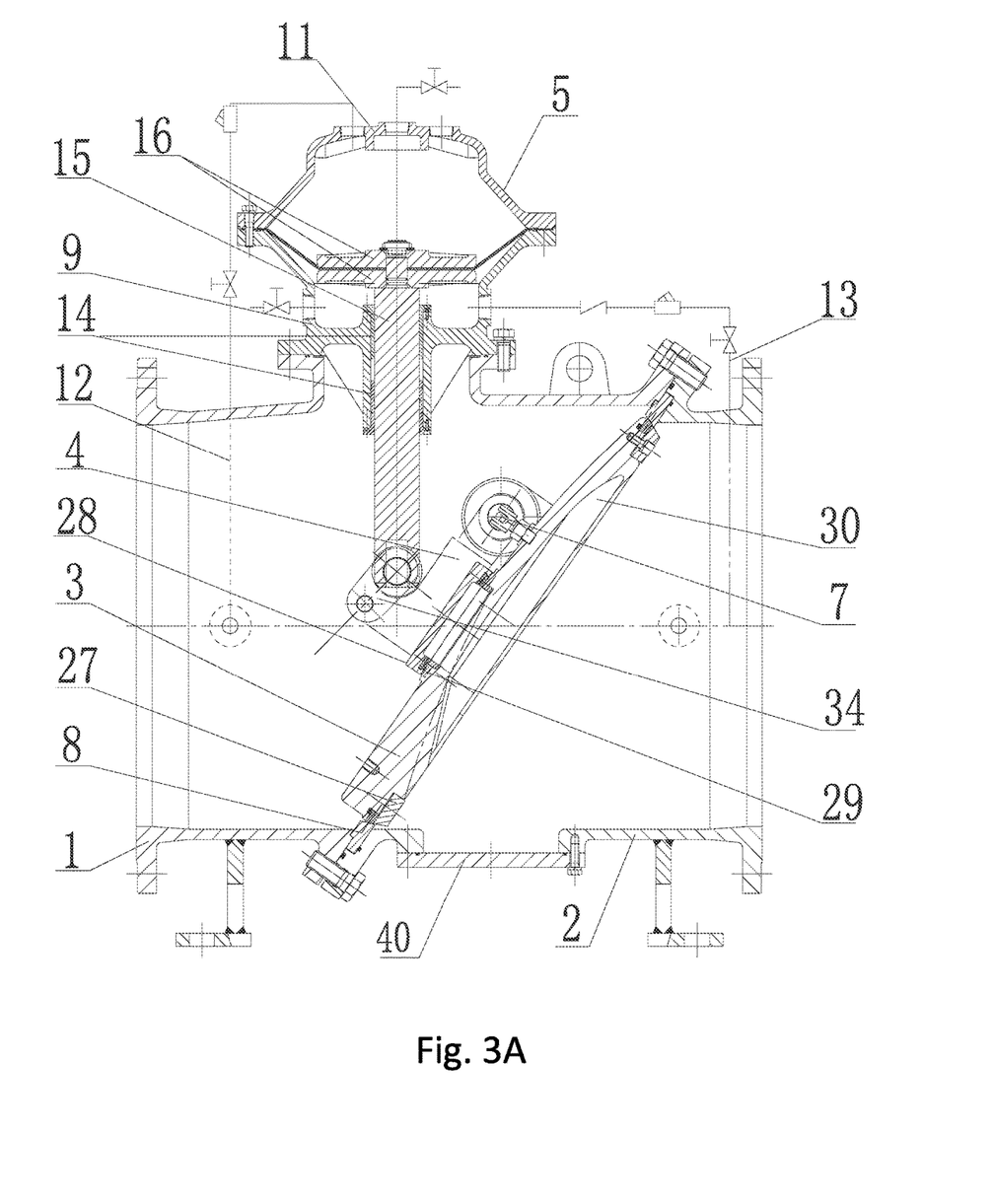
FIGS. 3A-3B are side sectional view diagrams of a diaphragm control connecting rod type tilting disc check valve according to a preferred embodiment of the invention showing diaphragm and valve parts in moved positions.
Figure 3B:
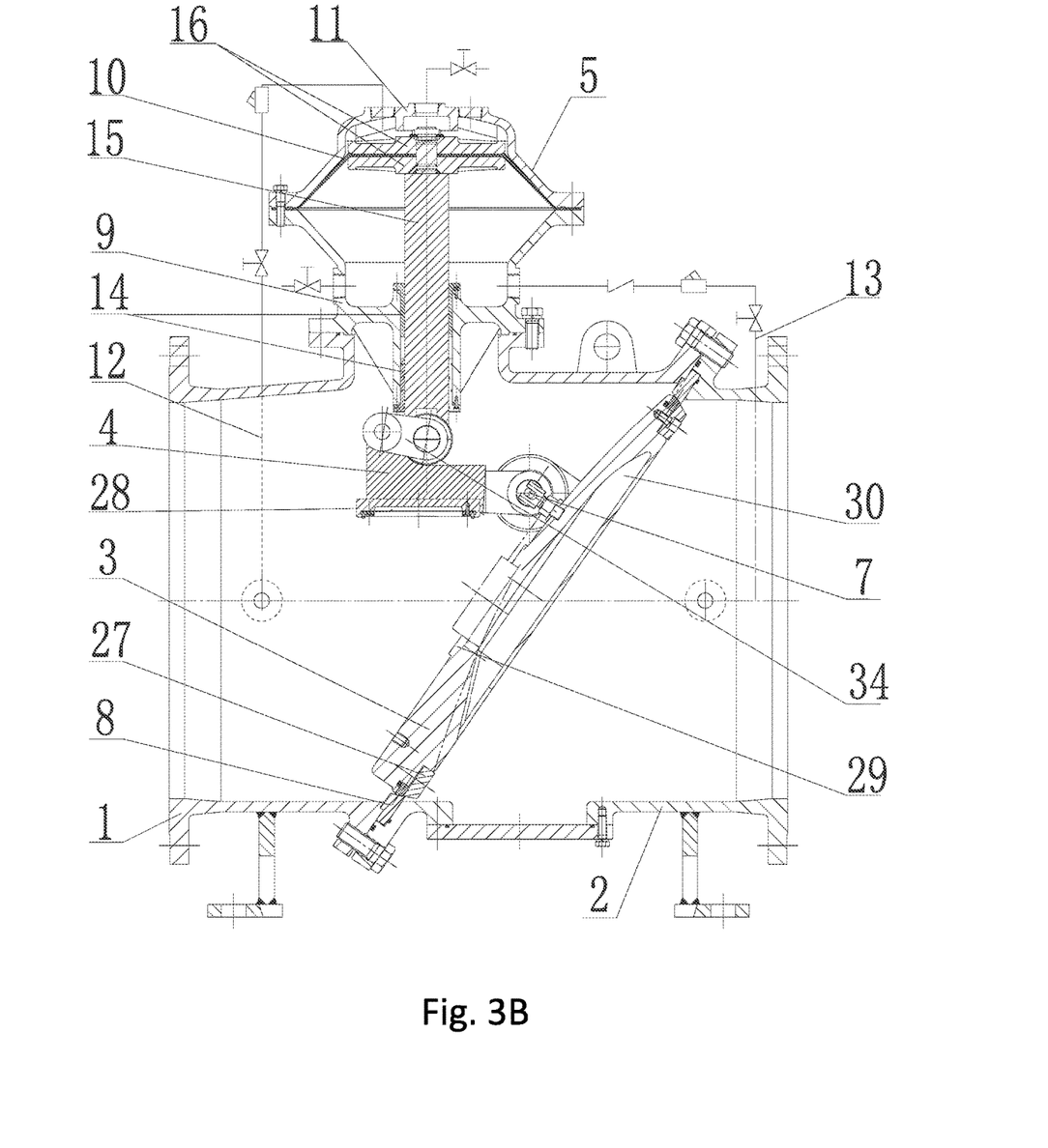
Figure 4:
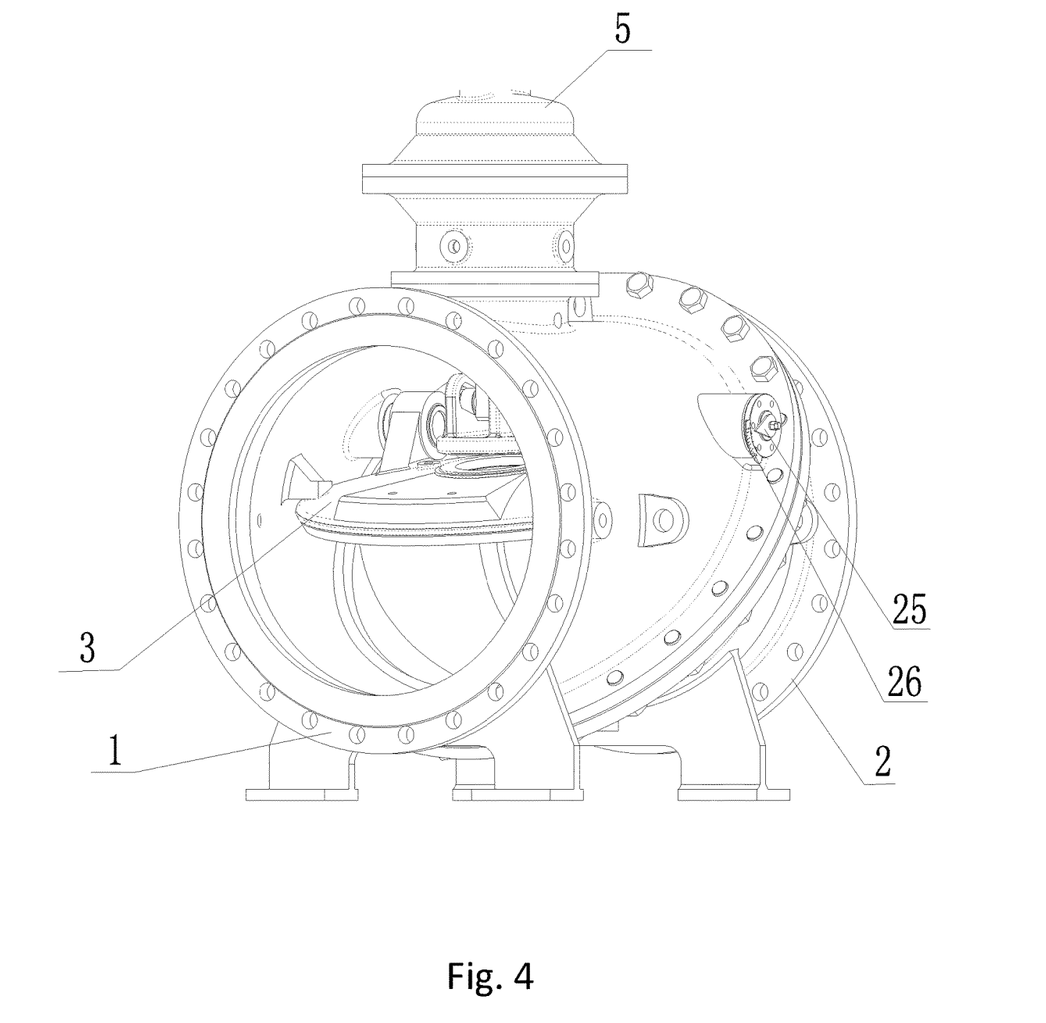
FIG. 4 is an exterior perspective view of a tilting disc check valve according to an embodiment of the invention.

FIGS. 1A-1C are side sectional diagrams of a diaphragm control slider type tilting disc check valve according to a preferred embodiment of the invention showing diaphragm and valve parts in moved positions, FIGS. 2A-2B are end sectional view diagrams of a diaphragm control slider type tilting disc check valve according to a preferred embodiment of the invention, showing diaphragm and valve parts in moved positions, FIG 2C is an end exterior view of a diaphragm control slider type tilting disc check valve according to an embodiment of the invention, FIGS. 3A-3B are side sectional view diagrams of a diaphragm control connecting rod type tilting disc check valve according to a preferred embodiment of the invention, showing diaphragm and valve parts in moved positions, and FIG. 4 is an exterior perspective view of a tilting disc check valve according to an embodiment of the invention. As shown in FIGS. 1A-1C, 2A-2C, 3A-3B, and 4,the tilting disc check valve includes a left valve body 1, a right valve body 2, a diaphragm control group 5, a large valve plate 3 and a small valve plate 4, wherein the left valve body 1 is connected with the right valve body 2 through oblique flanges and bolts; upper parts of the oblique flanges are inclined from the left valve body 1 to the right valve body 2; and an oblique valve seat 8 is positioned on the right valve body 2, is clamped between the two oblique flanges, and form included angles of 55 degrees with an axial line of a diaphragm control slider type tilting disc check valve pipeline. The large valve plate 3 is arranged along oblique openings, the large valve plate 3 is to suspended on shaft holes of the left valve body 1 through left and right valve shafts 6, the shaft holes are positioned ⅓ higher than the centre of the large valve plate 3, and the large valve plate 3 can rotate at a rotating angle of maximally 45 degrees around the left and right valve shafts 6. A rotating centre of the small valve plate 4 is concentric with a rotating centre of the large valve plate 3, the small valve plate 4 is connected with a tail end of a valve rod 15 in the diaphragm control group 5 through a slider 17, and a slow closing valve port of the large valve plate 4 can be sealed by a sealing pair.

A double-valve plate design with the quick closing large valve plate and the slow closing small valve plate is adopted, the valve is opened slowly and then quickly when being opened, and slow opening is adjustable; when the valve is closed, the large valve plate 3 is completely closed to cut off 95 percent of flow passage area when forward water flow approaches zero flow velocity under the dynamic balance of eccentric gravitational moment and forward residual flow thrust moment; probable backflow increasing pressure is unloaded and released by adjustable slow closing of the slow closing small valve plate; and in addition, in a valve closing process, the size of an upper diaphragm cavity with a rubber diaphragm 10 communicated with an outlet of the valve through a bypass pipe is slowly enlarged, which has a good arrestment function in backflow increasing pressure, and is equivalent to a water hammer arrester, so that the valve has an optimal pump starting and stopping water hammer reduction function.

Furthermore, the oblique openings or the large valve plate 3 forms an included angle of 50 to 65 degrees with a horizontal plane. The diaphragm control group 5 includes the valve rod 15, and the valve rod 15 is connected with a connecting rod 34 and/or a slider 17, the diaphragm control group 5 is connected with the small valve plate 4 through the connecting rod 34 and/or the slider 17 so as to ensure that the valve rod 15 of the diaphragm control group 5 is linked with the small valve plate 4, and there is no interference between the up-and-down movement of the valve rod 15 and the rotational movement of the small valve plate 4. The valve shafts 6 are symmetrically arranged on the two sides of the large valve plate 3, and valve plate bearings 21 functioning in connection when the large valve plate is opened and closed are arranged on matching surfaces of the valve shafts 6 and the valve rod 15; thrust bearings 19 are arranged on end faces of the valve shafts 6; and the valve plate bearings 21 and the thrust bearings 19 are all self-lubricating bearings. A streamlined sunken portion 30 which is inwards sunken is arranged on an outer surface of the side, close to the right valve body 2, of the large valve plate 3, and the large valve plate 3 is further provided with a clump weight; a centre-of-gravity position of the large valve plate 3 with the sunken part 30 and the clump weight is checked, so that the large valve plate 3 can be completely closed under the action of self weight; and the area of a plate surface of the small valve plate 4 is 3 to 10 percent of that of a plate surface of the large valve plate 3. The oblique valve seas 8 is arranged between the left valve plate 1 and the right valve plate 2, a valve plate sealing ring 27 is arranged on the large valve plate 3, and the valve plate sealing ring 27 and the oblique valve seat 8 form a pair of large valve plate sealing pair; the large valve sealing pair adopts a spherical and conical contact sealing form for sealing; and the valve plate sealing ring 27 is made of a metal hard sealing material and/or a flexible sealing material. The oblique flanges are arranged on the oblique openings of the left valve body 1 and the right valve body 2, the oblique valve seat 8 is clamped between the oblique flange of the left valve body 1 and the oblique flange of the right valve body 2, and the oblique valve seat 8 is a detachable part or a non-detachable integrated unit. A reserved interface is provided in a bottom of the tilting disc check valve, and a sealing cover or a damper is arranged on the reserved interface. Opening indication devices are connected to the valve shafts, and each of the opening indication devices includes an opening positioning column 23, an opening indication rod 24, an opening pointer 25 and an opening label 26; the opening positioning columns 23 are arranged at parts respectively, connected with the large valve plate 3, of the valve shafts 6; the opening indication rods 24 are arranged in the hollow valve shafts 6 respectively; one end of each opening indication rod 24 is connected with the corresponding opening positioning column 23, and the other end of each opening indication rod 24 is exposed from the corresponding valve shaft 6, and penetrates through an end cover 22; the opening pointers 25 are arranged on the opening indication rods 24 penetrating through the end covers 22, and point to the opening labels 26 respectively; or signal sending devices are further mounted on the opening indication devices. The diaphragm control group 5 includes a diaphragm seat 9, a rubber diaphragm 10 and a valve cover 11; a chamber formed by the diaphragm seat 9 and the valve cover 11 is divided into two parts, i.e. the upper diaphragm cavity and a lower diaphragm cavity, through which no water passes, in a manner that the rubber diaphragm 10 serves as an interface; the upper diaphragm cavity is communicated with the outlet of the valve through an upper bypass pipe 12; the lower diaphragm cavity is communicated with an inlet of the valve through a lower bypass pipe 13; the diaphragm control group 5 further includes a valve rod bushing 14, the valve rod 15 and diaphragm pressure plates 16; the diaphragm pressure plates 16 are closely attached to the rubber diaphragm 10; the valve rod bushing 14 is fixed on the diaphragm seat 9; an upper part of the valve rod 15 penetrates through the rubber diaphragm 10 and the diaphragm pressure plates 16, and is fixed on an overlapped part formed by the rubber diaphragm 10 and the diaphragm pressure plates 16; a middle part of the valve rod 15 is sleeved with the valve rod bushing 14; a lower end of the valve rod 15 is connected to the small valve plate 4; the slider 17 and/or the connecting rod 34 are/is arranged at the lower end of the valve rod 15; the sliding chute 18 is formed in the small valve plate 4; the valve rod 15 is connected with the small valve plate 4 through the slider 17 and/or the connecting rod 34; the valve rod 15 is kept in a vertical direction through the sliding of the slider 17 in the sliding chute or through the connecting rod 34; and volumes of the upper diaphragm cavity and the lower diaphragm cavity change under the influence of a water pressure difference between the inlet of the valve and the outlet of the valve, changes in the volumes drive the valve rod 15 to move up and down in the valve rod bushing 14, and up-and-down movement is transmitted to the small valve plate 4 through the slider 17 to make the small valve plate rotate 4 around a small valve plate pin shaft 7.

Furthermore, the diaphragm control group 15 includes the diaphragm seat 9, the valve rod 15, the rubber diaphragm 10, the diaphragm pressure plates 16, the valve cover 11, the slider 17 and the valve rod bushing 14, wherein the diaphragm pressure plates 16 and the rubber diaphragm 10 are arranged in a diaphragm cavity formed by the diaphragm seat 9 and the valve cover 11; the diaphragm pressure plates 16 are closely attached to upper and lower diaphragm surfaces of the rubber diaphragm 10 respectively; and the overlapped part of the diaphragm pressure plates 16 and the rubber diaphragm 10 is fixed with a top end of the valve rod 15. The diaphragm cavity is divided into the upper diaphragm cavity and the lower diaphragm cavity, which are not communicated vertically, by the rubber diaphragm 10. The upper diaphragm cavity and the lower diaphragm cavity are communicated with a pipeline of the outlet of the valve and a pipeline of the inlet of the valve through the upper bypass pipe 12 and the lower bypass pipe 13 respectively. The slider 17 is mounted at the lower tail end of the valve rod 15 in the diaphragm control group 5 through a valve rod pin shaft 31, the sliding chute 18 is provided in the small valve plate 4, and the slider 17 is positioned in the sliding chute 18. When the valve rod 15 moves up and down under the influence of a pressure difference between the upper and lower diaphragm cavities, the slider 17 slides in the sliding chute 18 of the small valve plate 4, and the up-and-down movement of the valve rod 15 is converted into the rotational movement of the small valve plate 4 around the small valve plate pin shaft 7, thereby forming a slider connecting rod mechanism. When the small valve plate 4 is kept at a completely-closed position, a centreline of the sliding chute 18 of the slider connecting rod mechanism is kept in a horizontal direction. A protrusion-free circumferential straddle screw disconnection and loosening prevention structure is adopted for each of a joint of the slider 17 and the valve rod 15 and a joint between the small valve plate 4 and the small valve plate pin shaft 7. The thrust bearings 19 are mounted at the two ends of the shaft holes of the large valve plate 3 respectively, and the large valve plate 3 is completely positioned in the direction of the shaft holes through the left and right valve shafts 6 and the left and right end covers 22, so that the large valve plate 3 is endowed with sufficient rotating flexibility, and is further prevented from play caused by the disturbance of water flow. In the invention, the slider connecting rod mechanism is adopted to completely control the slow closing small valve plate, circumferential straddle screws are adopted to prevent loosening, the impact of water flow is avoided, vibration is resisted, and the phenomenon of detachment during use is completely eradicated. With the adoption of the slider connecting rod mechanism, force on the small valve plate 4 at a closing position with maximum force is perpendicularly loaded to a horizontal sliding chute surface in terms of design, and reaction on the valve rod 15 passes through its axial line to prevent bending moment, so that the phenomenon that the valve rod is subjected to bending moment and the bushing is squeezed with the adoption of a chain plate structure in an existing technology is avoided. The large valve plate 3 is axially and completely positioned without play, and can rotate flexibly without jamming. In the invention, the large valve plate 3 is axially and completely positioned through the thrust bearings 19, so that the large valve plate 3 is completely prevented from play during running, is opened and closed without jamming, can move flexibly, and can be timely and accurately adapted to a transient water flow change, and the valve can be stably closed without collision. Therefore, only a flexible sealing form can be adopted in the existing technology under normal circumstances, but a metal hard sealing form can be adopted in the invention, only the valve plate sealing ring 27 is required to be replaced for the flexible sealing and hard sealing forms, the other parts may be completely universal, actual zero-flow-velocity quick closing can be realized, and inter-changeability between the flexible and hard sealing forms is achieved.

Furthermore, the oblique flanges are arranged on the left valve body 1 and the right valve body 2 respectively, and the left valve body and the right valve body are connected into a whole through the flanges and bolts. The oblique valve seat 8 is arranged on the right valve body 2, and is clamped between the oblique flange of the left valve body 1 and the oblique flange of the right valve body 2. The diaphragm control group 5 includes the diaphragm seat 9, the rubber diaphragm 10 and the valve cover 11; the chamber formed by the diaphragm seat 9 and the valve cover 11 is divided into two parts, i.e. the upper diaphragm cavity and the lower diaphragm cavity, through which no water passes, in the manner that the rubber diaphragm 10 serves as the interface; the upper diaphragm cavity is communicated with the outlet of the valve through the upper bypass pipe 12; and the lower diaphragm cavity is communicated with the inlet of the valve through the lower bypass pipe 13. The diaphragm control group 5 further includes the valve rod bushing 14, the valve rod 15 and the diaphragm pressure plates 16; the diaphragm pressure plates 16 are closely attached to the rubber diaphragm 10; the valve rod bushing 14 is fixed on the diaphragm seat 9; the upper part of the valve rod 15 penetrates through the rubber diaphragm 10 and the diaphragm pressure plates 16, and is fixed on the overlapped part formed by the rubber diaphragm 10 and the diaphragm pressure plates 16; the middle part of the valve rod 15 is sleeved with the valve rod bushing 14; and the lower end of the valve rod 15 is connected to the small valve plate 4. The slider 17 is arranged at the lower end of the valve rod 15; the sliding chute 18 or the shaft holes are formed in the small valve plate 4; the valve rod 15 is connected with the small valve plate 4 through the slider 17 and/or the connecting rod 34; and the valve rod 15 is kept in the vertical direction through the sliding of the slider 17 in the sliding chute 18, or the valve rod 15 is kept in the vertical direction through the connecting rod 34. The volumes of the upper diaphragm cavity and the lower diaphragm cavity change under the influence of the water pressure difference between the inlet of the valve and the outlet of the valve, the changes in the volumes drive the valve rod 15 to move up and down in the valve rod bushing 14, and the up-and-down movement is transmitted to the small valve plate 4 through the slider 17 to make the small valve plate rotate 4 around the small valve plate pin shaft 7. The diaphragm pressure plates 16 are arranged on the upper and lower diaphragm surfaces of the rubber diaphragm 10 respectively. The oblique openings, the oblique flanges or the oblique valve seat 8 forms an included angle of 40 to 70 degrees with a horizontal plane. A protrusion-free and circumferential straddle locking disconnection prevention mechanism is adopted for the small valve plate pin shaft 7. The valve shafts 6 are symmetrically arranged on the two sides of the large valve plate 3, and the valve shafts 6 arranged on the two sides of the large valve plate 3 are concentric with the axial line of the small valve plate pin shaft 7; and the two ends of the valve shafts 6 are connected to the left valve body 1 and the large valve plate 3 respectively. One end of each valve shaft 6 is connected to the left valve body 1 through a movable shaft, the other ends of the valve shafts 6 are connected to the large valve plate 3 through thrust bearings 19, bearing positioning sleeves 20, the valve plate bearings 21 and the end covers 22, and the valve shafts 6 position the large valve plate 3 to make the large valve plate only rotate along the valve plate bearings 21 without axial play. The valve shafts 6 and limiting blocks on the left valve body limit the large valve plate 3 to perform rotational movement at a rotating angle of maximally 45 degrees around the valve shafts 6. The opening indication devices are connected to the valve shafts 6. The opening indication devices include the opening positioning columns 23, the opening indication rods 24, the opening pointers 25 and the opening labels 26; the opening positioning columns 23 are arranged at the parts, connected with the large valve plate 3, of the valve shafts 6; the opening indication rods 24 are arranged in the hollow valve shafts 6 respectively; one end of each opening indication rod 24 is connected with the corresponding opening positioning column 23, and the other end of each opening indication rod 24 is exposed from the corresponding valve shaft 6, and penetrates through the corresponding end cover 22; and the opening pointers 25 are arranged on the opening indication rods 24 penetrating through the end covers 22, and point to the opening labels 26 respectively. The valve plate sealing ring 27 is mounted at an outer circle part of an upstream surface of the large valve plate 3, and the valve plate sealing ring 27 and the oblique valve seat 8 form the large valve plate sealing pair; small valve plate rubber rings 28 are mounted on a bottom surface of the small valve plate 4, and the small valve plate rubber rings 28 and a slow closing valve seat 29 mounted at the slow closing valve port a of the large valve plate 3 form a pair of slow closing valve port sealing pairs. The streamlined drop-shaped sunken portion 30 is designed on the outer surface of one side of the upstream surface of the large valve plate 3, and the large valve plate is further provided with the clump weight. The centre-of-gravity position of the large valve plate 3 with the sunken portion 30 and the clump weight is checked, so that the large valve plate 3 can be completely closed under the action of self weight. The diaphragm control group 5 limits the small valve plate 4 to perform rotational movement at a rotating angle of maximally 55 degrees around the small valve plate pin shaft 7. The valve rod bushing 14 includes an upper valve rod bushing 32 and a lower valve rod bushing 33, and the valve rod 15 simultaneously penetrates through the upper valve rod bushing 32 and the lower valve rod bushing 33.

Furthermore, the valve rod is connected with the small valve plate 4 through the connecting rod. The sliding chute 18 is further provided in the small valve plate 4, and the slider 17 is matched with the sliding chute 18 to connect the valve rod 15 with the small valve plate 4. The valve rod 15 is connected with the small valve plate 4 through a combined part of the slider 17 and the connecting rod 34. The valve rod 15 is kept in the vertical direction through the sliding of the slider 17 in the sliding chute 18 or through the connecting rod 34. The volumes of the upper diaphragm cavity and the lower diaphragm cavity change under the influence of the water pressure difference between the inlet of the valve and the outlet of the valve, the changes in the volumes drive the valve rod 15 to move up and down in the valve rod bushing 14, and the up-and-down movement is transmitted to the small valve plate 4 through the slider 17 and/or the connecting rod 34 to make the small valve plate 4 rotates around the small valve plate pin shaft 7.

Furthermore, the opening indication devices for the large valve plate 3 are additionally arranged, and a travel opening indicator for the small valve plate 4 can be additionally arranged conveniently, so that the opening of the large and small valve plates can be displayed in real time.

Furthermore, parameters of a bottom surface hollowing form and back surface clump weight of the large valve plate are three-dimensionally optimized and designed, so that each section of the large valve plate 3 in a water flow direction is approximate to a low-flow-resistance streamlined drop shape; and after the valve is opened, the quick closing large valve plate 3 can be kept at a completely-opened position and limited at the completely-opened position by small forward water flow, and is prevented from vibrating along with the water flow, and the large valve plate 3 is completely positioned without vibration, so that water head loss of the valve is reduced.

When the pump is stopped, the large valve plate 3 capable of flexibly rotating can fall to a corresponding position along with the reduction of the forward water flow under the action of eccentric gravitational moment, and when the forward water flow is approximate to zero, the large valve plate 3 is timely closed, thereby closing the valve at a zero flow velocity to cut off over 95 percent of flow passage area.

The small valve plate 4 controlled by the diaphragm control group 5 adopts the protrusion-free circumferential straddle screw disconnection and loosening structure, so that the phenomenon of disconnection during use is avoided, and worry about impurities in the water flow is eliminated. In an initial opening state, the small valve plate 4 transmits the water pressure difference of the diaphragm cavity to the large valve plate 3 to control an opening velocity of the large valve plate 3 to realize slow opening; and when the small valve plate 4 is closed, the small valve plate 4 transmits the water pressure difference of the diaphragm cavity to the large valve plate 3 to increase sealing specific pressure of the large valve plate 3 to close the large valve plate 3 more tightly.

When the water pump is initially started, the valve is kept in a closed state to generate pressure for the water pump, so that valve closing light-load pump starting is realized, and starting current of a water pump motor is reduced; and when the water pump normally runs and pressure of a water inlet side increases, the large and small valve plates are opened by virtue of the water pressure difference between the two sides of the valve plates, a maximum opening angle of the quick closing large valve plate 3 is relevant to flow and pressure, and the small valve plate 4 can be kept at the maximum opening without vibration by only a pressure difference of 2 m under the control of the pressure difference of the upper and lower diaphragm cavities. When the water pump is stopped and the flow and pressure of the forward water flow are reduced, the quick closing large valve plate 3 falls to be closed to cut off most of the flow passage area under the action of self weight, and is quickly closed to cut off a great amount of backflow, and after the large valve plate 3 is completely closed, the small valve plate 4 slowly descends to close a drain hole along with control over the valve rod 15 under the control of the diaphragm control group 5 to realize slow closing to reduce the reversal time and maximum reversal rotating velocity of the water pump to prevent water hammer impact, and in addition, the upper diaphragm cavity can function in absorbing a boosting water head as an energy absorption cavity in a volume enlargement process to provide hammer elimination protection for a water pump unit and a pipeline system.

The above is only the preferred embodiment of the invention and not intended to limit the disclosure, and for those skilled in the art, the invention may have various modifications and variations. Any modifications, equivalent replacements, improvements and the like made within the spirit and principle of the invention shall fall within the scope of protection of the invention.

The invention claimed is:

1. A tilting disc check valve, comprising a first valve body, a second valve body, a large valve plate, a small valve plate and a diaphragm control group, wherein
   the first valve body has an oblique opening and the second valve body has an oblique opening wherein both openings are abutted against each other and joined to form a combined valve body comprising the first valve body and the second valve body;
   the oblique openings are abutted at a matching angle from vertical such that an upper portion of the abutted oblique openings is positioned further towards the second valve body than a lower portion of the abutted oblique openings;
   the diaphragm control group is arranged on the first valve body;
   the large valve plate is arranged to be able to move within the combined valve body to a position aligned with the oblique openings;
   the large valve plate is suspended on shaft holes of the first valve body through valve shafts;
   the small valve plate is connected with the diaphragm control group;
   the small valve plate is mounted at a slow closing valve port of the large valve plate through a small valve plate pin shaft;
   an opening indication device is connected to a valve shaft, wherein the valve shaft is hollow;
   the opening indication device comprises an opening positioning column, an opening indication rod, an opening pointer and an opening label;
   the opening positioning column is arranged at a portion of the valve shaft connected with the large valve plate;
   the opening indication rod is arranged in the hollow valve shaft;
   one end of the opening indication rod is connected with the opening positioning column, and the other end of the opening indication rod is exposed from the valve shaft, and penetrates through an end cover;
   the opening pointer is arranged on the opening indication rod penetrating through the end cover; and
   the opening pointer points to the opening label.

2. The tilting disc check valve according to claim 1, wherein an included angle between each of the oblique openings or the large valve plate and a horizontal plane is 56 to 65 degrees.

3. The tilting disc check valve according to claim 1, wherein
   the diaphragm control group comprises a valve rod;

the valve rod is connected with a connecting rod and/or a slider; and the diaphragm control group is connected with the small valve plate through the connecting rod and/or the slider so as to ensure that the valve rod of the diaphragm control group is linked with the small valve plate.

4. The tilting disc check valve according to claim 1, wherein the valve shafts are symmetrically arranged on two sides of the large valve plate;

valve plate bearings are arranged on the valve shafts;

thrust bearings are arranged at intermediate faces of the valve shafts (6); and the valve plate bearings and the thrust bearings are all self-lubricating bearings.

5. The tilting disc check valve according to claim 1, wherein a streamlined sunken portion which is concave recessed is arranged on an outer surface of the large valve plate facing into the second valve body;

the large valve plate is further provided with a clump weight;

a center-of-gravity position of the large valve plate with the sunken part and the clump weight is configured so that the large valve plate can be completely closed under the action of its own weight; and an area of a plate surface of the small valve plate is 3 to 10 percent of that of a plate surface of the large valve plate.

6. The tilting disc check valve according to claim 1, wherein an oblique valve seat having a conical inner surface is arranged between the first valve body and the second valve body;

a valve plate sealing ring having a spherical outer surface is arranged on the large valve plate;

the valve plate sealing ring and the oblique valve seat form a large valve plate sealing pair, wherein the conical inner surface of the oblique valve seat and the spherical outer surface of the valve plate sealing ring can form a seal; and the valve plate sealing ring is made of a metal hard sealing material and/or a flexible sealing material.

7. The tilting disc check valve according to claim 1, wherein oblique flanges are arranged on the oblique openings of the first valve body and the second valve body;

the oblique valve seat is clamped between the oblique flange of the first valve body and the oblique flange of the second valve body; and the oblique valve seat is a detachable part or a non-detachable integrated unit.

8. The tilting disc check valve according to claim 1, wherein a reserved interface is provided in a bottom of the tilting disc check valve, and a sealing cover or a damper is mounted on the reserved interface.

9. The tilting disc check valve according to claim 1, wherein the diaphragm control group comprises a diaphragm seat, a rubber diaphragm and a valve cover;

a chamber formed by the diaphragm seat and the valve cover is divided into two parts, i.e. an upper diaphragm cavity and a lower diaphragm cavity, through which no water passes, in a manner that the rubber diaphragm serves as an interface;

the upper diaphragm cavity is communicated with an outlet of the valve through an upper bypass pipe;

the lower diaphragm cavity is communicated with an inlet of the valve through a lower bypass pipe;

the diaphragm control group further comprises a valve rod bushing, the valve rod and diaphragm pressure plates;

the diaphragm pressure plates are closely attached to the rubber diaphragm;

the valve rod bushing is fixed on the diaphragm seat;

an upper part of the valve rod penetrates through the rubber diaphragm and the diaphragm pressure plates, and is fixed on an overlapped part formed by the rubber diaphragm and the diaphragm pressure plates;

a middle part of the valve rod is sleeved with the valve rod bushing;

a lower end of the valve rod is connected to the small valve plate;

a slider and/or a connecting rod are/is arranged at the lower end of the valve rod, wherein:

the valve rod is connected with the small valve plate through the connecting rod, or a sliding chute is further provided in the small valve plate, and the slider is matched with the sliding chute to connect the valve rod with the small valve plate, or the valve rod is connected with the small valve plate through a combined part of the slider and the connecting rod;

the valve rod is kept in a vertical direction through the sliding of the slider in the sliding chute or through the connecting rod; and volumes of the upper diaphragm cavity and the lower diaphragm cavity change under the influence of a water pressure difference between an inlet of the valve and an outlet of the valve, changes in the volumes drive the valve rod to move up and down in the valve rod bushing, and the up-and-down movement is transmitted to the small valve plate through the slider and/or the connecting rod to make the small valve plate rotate around the small valve plate pin shaft.

10. The tilting disc check valve according to claim 1, wherein one end of each valve shaft is connected to the first valve body through a movable shaft, the other end of each valve shaft is connected to the large valve plate through a thrust bearing, a bearing positioning sleeve, a valve plate bearing and an end cover, the valve shafts position the large valve plate to make the large valve plate only rotate along the valve plate bearings without axial play, and the valve shafts enable rotation of the large valve plate, and a limiting block limits the rotation of the large valve plate around the valve shafts.

11. The tilting disc check valve according to claim 1, wherein the diaphragm control group further comprises a valve rod bushing, the valve rod bushing comprises an upper valve rod bushing and a lower valve rod bushing, and the valve rod simultaneously penetrates through the upper valve rod bushing and the lower valve rod bushing.

12. A tilting disc check valve, comprising a large valve plate and a small valve plate, wherein the tilting disc check valve further comprises a diaphragm control group, the small valve plate is connected with the diaphragm control group, the diaphragm control group comprises a valve rod,
a slider and/or a connecting rod are/is arranged at a lower end of the valve rod, wherein
the valve rod is connected with the small valve plate through the connecting rod, or
a sliding chute is further provided in the small valve plate, the slider is matched with the sliding chute to connect the valve rod with the small valve plate, or
the valve rod is connected with the small valve plate through a combined part of the slider and the connecting rod;
the large valve plate is connected to valve shafts,
an opening indication device is connected to a valve shaft, wherein the valve shaft is hollow;
the opening indication device comprises an opening positioning column, an opening indication rod, an opening pointer and an opening label;
the opening positioning column is arranged at a portion of the valve shaft connected with the large valve plate;
the opening indication rod is arranged in the hollow valve shaft;
one end of the opening indication rod is connected with the opening positioning column, and the other end of the opening indication rod is exposed from the valve shaft, and penetrates through an end cover;
the opening pointer is arranged on the opening indication rod penetrating through the end cover; and
the opening pointer points to the opening label.

13. The tilting disc check valve according to claim 12, wherein
the tilting disc check valve comprises a first valve body and a second valve body,
the first valve body has an oblique opening and the second valve body has an oblique opening wherein both openings are abutted against each other and joined to form a combined valve body comprising the first valve body and the second valve body;
the oblique openings are abutted at a matching angle from vertical such that an upper portion of the abutted oblique openings is positioned further towards the second valve body than a lower portion of the abutted oblique openings;
the diaphragm control group is arranged on the first valve body;
the large valve plate is arranged to be able to move within the combined valve body to a position aligned with the oblique openings;
the large valve plate is suspended on shaft holes of the first valve body through the valve shafts,
the small valve plate is mounted at a slow closing valve port of the large valve plate through a small valve plate pin shaft.

14. The tilting disc check valve according to claim 13, wherein
one end of each valve shaft is connected to the first valve body through a movable shaft, the other end of each valve shaft is connected to the large valve plate through a thrust bearing, a bearing positioning sleeve, a valve plate bearing and an end cover,
the valve shafts position the large valve plate to make the large valve plate only rotate along the valve plate bearings without axial play, and
the valve shafts enable rotation of the large valve plate, and a limiting block limits the rotation of the large valve plate around the valve shafts.

15. The tilting disc check valve according to claim 12, wherein
the diaphragm control group further comprises a diaphragm seat, a rubber diaphragm, diaphragm pressure plates, a valve cover, and a valve rod bushing,
the diaphragm pressure plates and the rubber diaphragm are arranged in a diaphragm cavity formed by the diaphragm seat and the valve cover,
the diaphragm pressure plates are closely attached to upper and lower diaphragm surfaces of the rubber diaphragm respectively,
an overlapped part formed by the diaphragm pressure plates and the rubber diaphragm is fixed with a top end of the valve rod;
the rubber diaphragm divides the diaphragm cavity into an upper diaphragm cavity and a lower diaphragm cavity, through which no water passes, and
the upper diaphragm cavity is communicated with a pipeline of an outlet of the valve through an upper bypass pipe and the lower diaphragm cavity is communicated with a pipeline of an inlet of the valve through a lower bypass pipe.

16. The tilting disc check valve according to claim 12, wherein
a reserved interface is provided in a bottom of the oblique plate check valve, and
a sealing cover or a damper is mounted on the reserved interface.

17. The tilting disc check valve according to claim 12, wherein
the diaphragm control group further comprises a valve rod bushing, diaphragm pressure plates, a diaphragm seat, a rubber diaphragm and a valve cover;
a chamber formed by the diaphragm seat and the valve cover is divided into two parts, i.e. an upper diaphragm cavity and a lower diaphragm cavity, through which no water passes, in a manner that the rubber diaphragm serves as an interface;
the upper diaphragm cavity is communicated with an outlet of the valve through an upper bypass pipe;
the lower diaphragm cavity is communicated with an inlet of the valve through a lower bypass pipe;
the diaphragm pressure plates are closely attached to the rubber diaphragm;
the valve rod bushing is fixed on the diaphragm seat;
an upper part of the valve rod penetrates through the rubber diaphragm and the diaphragm pressure plates, and is fixed on an overlapped part formed by the rubber diaphragm and the diaphragm pressure plates;
a middle part of the valve rod is sleeved with the valve rod bushing;
a lower end of the valve rod is connected to the small valve plate;
the valve rod is kept in a vertical direction through the sliding of the slider in the sliding chute or through the connecting rod; and
volumes of the upper diaphragm cavity and the lower diaphragm cavity change under the influence of a water pressure difference between an inlet of the valve and an outlet of the valve, changes in the volumes drive the valve rod to move up and down in the valve rod bushing, and the up-and-down movement is transmitted to the small valve plate through the slider and/or the connecting rod to make the small valve plate rotate around the small valve plate pin shaft.

18. The tilting disc check valve according to claim 12, wherein
the diaphragm control group further comprises the valve rod bushing, the valve rod bushing comprises an upper valve rod bushing and a lower valve rod bushing, and
the valve rod simultaneously penetrates through the upper valve rod bushing and the lower valve rod bushing.

* * * * *